(12) United States Patent
Katsunuma

(10) Patent No.: US 8,351,033 B2
(45) Date of Patent: Jan. 8, 2013

(54) TUNABLE FILTER, LIGHT SOURCE APPARATUS, AND SPECTRAL DISTRIBUTION MEASURING APPARATUS

(75) Inventor: Atsushi Katsunuma, Tokyo (JP)

(73) Assignee: Nikon Corporation, Tokyo (JP)

( * ) Notice: Subject to any disclaimer, the term of this patent is extended or adjusted under 35 U.S.C. 154(b) by 254 days.

(21) Appl. No.: 12/627,842

(22) Filed: Nov. 30, 2009

(65) Prior Publication Data
US 2010/0141950 A1 Jun. 10, 2010

Related U.S. Application Data

(63) Continuation of application No. PCT/JP2008/059383, filed on May 21, 2008.

(30) Foreign Application Priority Data

May 31, 2007 (JP) .................................. 2007-144429

(51) Int. Cl.
*G01J 3/28* (2006.01)
(52) U.S. Cl. ....................................................... 356/327
(58) Field of Classification Search .................. 356/322, 356/327
See application file for complete search history.

(56) References Cited

U.S. PATENT DOCUMENTS

| 5,420,717 | A | 5/1995 | Tabata |
|---|---|---|---|
| 6,208,774 | B1 | 3/2001 | Sorin et al. |
| 6,504,943 | B1 * | 1/2003 | Sweatt et al. ................. 356/310 |
| 2001/0052977 | A1 | 12/2001 | Toyooka |
| 2003/0058516 | A1 * | 3/2003 | Scott et al. .................... 359/246 |
| 2004/0159797 | A1 * | 8/2004 | Wolleschensky ............. 356/364 |
| 2005/0073749 | A1 | 4/2005 | Helbing et al. |
| 2006/0256426 | A1 | 11/2006 | Wolleschensky |

FOREIGN PATENT DOCUMENTS

| EP | 0 548 830 A1 | 6/1993 |
|---|---|---|
| JP | H4-140714 | 5/1992 |
| JP | H5-232384 | 9/1993 |
| JP | 05-323265 | 12/1993 |
| JP | H08510564 (A) | 11/1996 |

(Continued)

OTHER PUBLICATIONS

Rusu et al., "Slicing the Supercontinuum Radiation Generated in Photonic Crystal Fiber Using an All-Fiber Chirped-Pulse Amplification System," *Opt. Express*, 13(17):6390-6400 (2005).

(Continued)

*Primary Examiner* — Kara E Geisel
(74) *Attorney, Agent, or Firm* — Klarquist Sparkman, LLP

(57) ABSTRACT

A tunable filter including: a polarization splitter that splits input light into two linearly polarized light rays of mutually orthogonal vibration directions; a wavelength dispersion spectroscopic element that splits the two linearly polarized light rays into two spectral images having spatial spread in one direction; and a reflective spatial modulator device that modulates and reflects linearly polarized light in each wavelength region for the two spectral images independently from each other. Modulated light reflected at the reflective spatial modulator device reenters the wavelength dispersion spectroscopic element and the polarization splitter, thereby splitting and outputting the modulated light, as output light in a wavelength region modulated by the reflective spatial modulator device and output light in a wavelength region not modulated, and input light and reentered light to the polarization splitter and input light and reentered light to the wavelength dispersion spectroscopic element are parallel light fluxes.

18 Claims, 6 Drawing Sheets

FOREIGN PATENT DOCUMENTS

| | | |
|---|---|---|
| JP | H11-101944 | 4/1999 |
| JP | 2001-13471 | 1/2001 |
| JP | 2004-228024 A | 8/2001 |
| JP | 2004-528751 (A) | 9/2004 |
| JP | 2005-115377 A | 4/2005 |
| WO | WO 94/28456 | 12/1994 |
| WO | WO 02/071133 A2 | 9/2002 |
| WO | WO 02/084379 A1 | 10/2002 |

OTHER PUBLICATIONS

Office Action for related Japanese Patent Application No. 2007-005557, 4 pages, dated Feb. 28, 2012, (includes English Translation).
Europe Search Report for related Patent Application No. EP 08 753 060.6, 6 pages, Aug. 14, 2012.

* cited by examiner

TUNABLE FILTER, LIGHT SOURCE APPARATUS, AND SPECTRAL DISTRIBUTION MEASURING APPARATUS

CROSS REFERENCE TO RELATED APPLICATION

This is a continuation application of PCT/JP2008/059383, filed on May 21, 2008, designating the U.S., which claims priority from and the benefit of, Japan Patent Application No. 2007-144429, filed on May 31, 2007, the contents of which are incorporated herein by reference in their entirety. This application also relates to Japan Patent Application No. 2007-5557, filed on Jan. 15, 2007, the contents of which are incorporated herein by reference.

BACKGROUND

1. Technical Field

The present invention relates to a tunable filter, a light source apparatus, and a spectral distribution measuring apparatus. In particular, the present invention relates to a tunable filter, a light source apparatus, and a spectral distribution measuring apparatus obtaining a predetermined spectral distribution by modulating linearly polarized light of each wavelength region.

2. Related Art

For example, Japanese Patent Application Publication No. H11-101944 discloses an arbitrary spectrum generating light source that converts continuous spectrum light by modulation spectroscopy into a predetermined spectrum and outputs the resulting light. The light source includes a spatial modulator device for an optical beam transmittance at a position corresponding to a light source spectrum image generated by an internal spectroscope, the spatial modulator device including a polarizer and a transmissive liquid crystal element array. This type of light source modulates the spectral characteristic and then synthesizes the wavelength using the internal spectroscope again, thereby outputting light having a predetermined spectrum. There is also a different type of light source apparatus that uses a reflective spatial modulator device, as disclosed in Japanese Patent Application Publication No. 2005-115377, for example.

In recent years, a supercontinuum light source has also started to be used, as disclosed in "Slicing the supercontinuum radiation generated in photonic crystal fiber using an all-fiber chirped-pulse amplification system": OPTICS EXPRESS Vol. 13, No. 17. Although being a white light source having a continuous spectrum, the supercontinuum light source can be considered as a point light source from the viewpoint of geometrical optics, and has a characteristic that every monochromatic light ray in the output light has a longer coherence than those of a conventional lamp light source.

SUMMARY

However, the light source disclosed in Japanese Patent Application Publication No. H11-101944 uses only a unidirectional linearly polarized light component of input light, and so the energy efficiency of its output light in relation to the input light tends to be small, if using the light source of "Slicing the supercontinuum radiation generated in photonic crystal fiber using an all-fiber chirped-pulse amplification system": OPTICS EXPRESS Vol. 13, No. 17. In the light source of Japanese Patent Application Publication No. 2005-115377, the converged or diverged light flux passes through a polarizer provided adjacent to a liquid crystal element, and so the light flux NA should be kept as small as possible, to prevent confusion in the polarization state and promote generation of output light that accurately reflects the modulation in the spatial modulator device.

In view of this, an object of the present invention is to provide a tunable filter, a light source apparatus, and a spectral distribution measuring apparatus, which are able to overcome the above drawbacks accompanying the conventional art. The above object can be achieved by combinations described in the independent claims. The dependent claims define further advantageous and exemplary combinations of the present invention.

In order to overcome the above drawbacks, according to a first aspect of the present invention, provided is a tunable filter including a polarization splitter that splits input light into two linearly polarized light rays of mutually orthogonal vibration directions. The filter includes a wavelength dispersion spectroscopic element that splits the two linearly polarized light rays split by the polarization splitter, into two spectral images having spatial spread in one direction (the two spectral images corresponding to the two linearly polarized light rays). The filter also includes a reflective spatial modulator device that modulates and reflects linearly polarized light in each wavelength region for the two spectral images independently from each other. Modulated light reflected at the reflective spatial modulator device reenters the wavelength dispersion spectroscopic element and the polarization splitter, thereby splitting and outputting the modulated light as output light in a wavelength region modulated by the reflective spatial modulator device and output light in a wavelength region not modulated. Input light and reentered light to the polarization splitter and input light and reentered light to the wavelength dispersion spectroscopic element are parallel light fluxes.

According to a second aspect of the present invention, provided is a light source apparatus including: the tunable filter and a light source section that inputs parallel light to the tunable filter.

According to a third aspect of the present invention, provided is a spectral distribution measuring apparatus including the tunable filter and a light amount measuring section that measures output light from the tunable filter. A spectral distribution of input light inputted to the tunable filter is measured based on a wavelength region modulated by the reflective spatial modulator device and an intensity of the output light measured by the light amount measuring section.

According to a fourth aspect of the present invention, provided is a tunable filter including a first polarization splitter that splits input light into two linearly polarized light rays of mutually orthogonal vibration directions. A first wavelength dispersion spectroscopic element splits the two linearly polarized light rays, split by the first polarization splitter, into two spectral images having spatial spread in one direction (the two spectral images correspond to the two linearly polarized light rays). The filter includes a transmissive spatial modulator device that modulates and transmits linearly polarized light in each wavelength region for the two spectral images independently from each other. A second wavelength dispersion spectroscopic element, provided in conjugate relationship with the first wavelength dispersion spectroscopic element, combines the two spectral images from the transmissive spatial modulator device, respectively, into two light fluxes. A second polarization splitter is provided in conjugate relationship with the first polarization splitter. The second polarization splitter splits and outputs the two light fluxes, from the second wavelength dispersion spectroscopic element, as output light in a wavelength region modulated by the transmissive spatial modulator device and output light in a wavelength region not modulated, both to be outputted. Input light to the first polarization splitter, the first wavelength dispersion spectroscopic element, the second wavelength dispersion spectroscopic element, and the second polarization splitter is parallel light flux.

According to a fifth aspect of the present invention, provided is a light source apparatus including the tunable filter and a light source section that inputs parallel light to the tunable filter.

According to a sixth aspect of the present invention, provided is a spectral distribution measuring apparatus including the tunable filter and a light amount measuring section that measures output light from the tunable filter. A spectral distribution of input light inputted to the tunable filter is measured based on a wavelength region modulated by the transmissive spatial modulator device and an intensity of the output light measured by the light amount measuring section.

The summary of the invention does not necessarily describe all necessary features of the present invention. The present invention may also be a sub-combination of the features described above.

Input light and reentry light to be input to a polarization splitter and a wavelength dispersion spectroscopic element are both parallel light fluxes. This arrangement helps prevent locality of polarization state modulation during passage through the polarization splitter and the wavelength dispersion spectroscopic element. As a result, output light can be obtained that accurately reflects the modulation in the reflective spatial modulator device and the transmissive spatial modulator device.

DESCRIPTION OF EXEMPLARY EMBODIMENTS

The invention will now be described based on the preferred embodiments, which do not intend to limit the scope of the present invention, but exemplify the invention. All of the features and the combinations thereof described in the embodiment are not necessarily essential to the invention.

Figure 1:
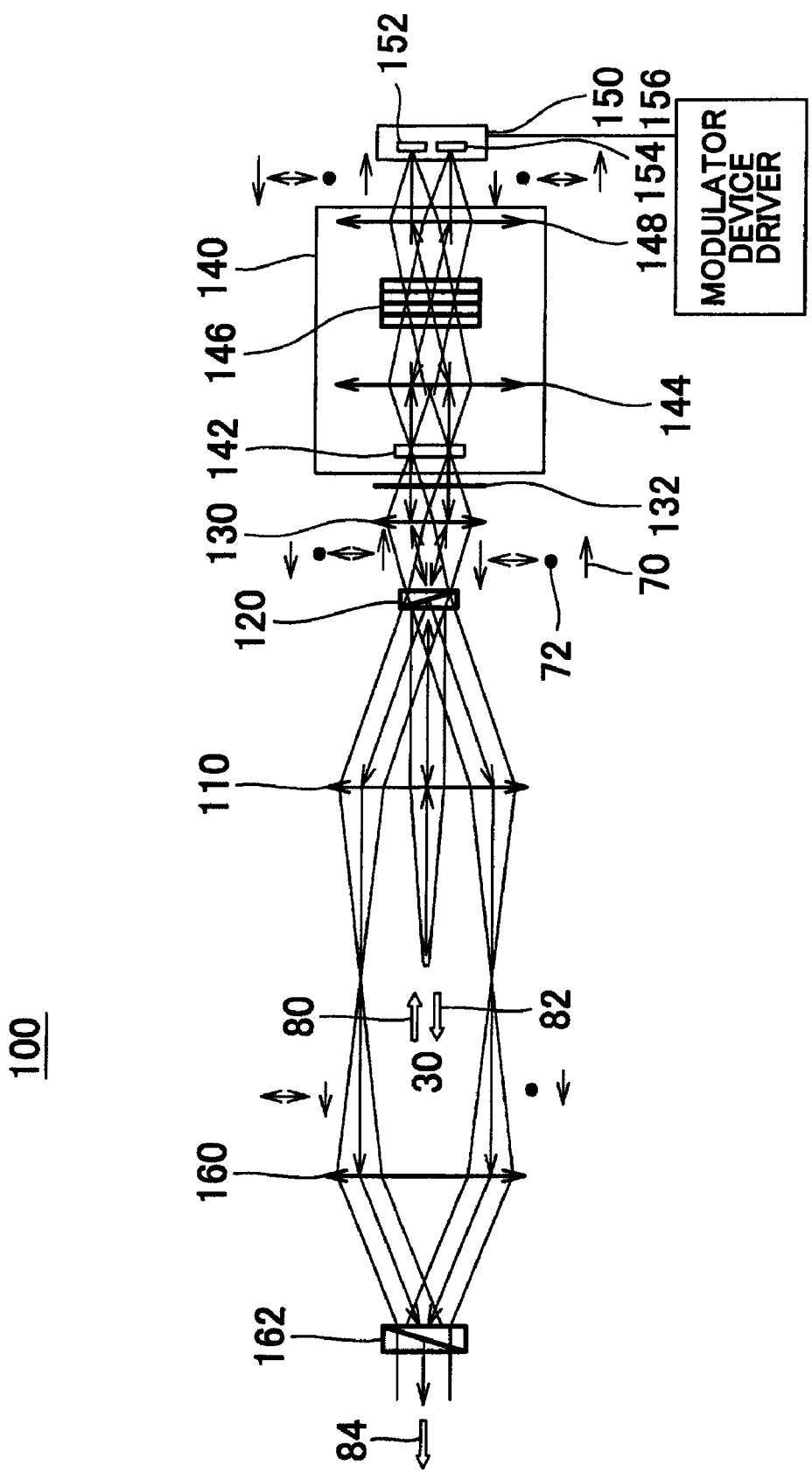
FIG. 1 shows an overview of a tunable filter 100 which is an example of an embodiment of the invention.

FIG. 1 shows an overview of a tunable filter 100 which is an example of an embodiment of the invention. The tunable filter 100 modulates the input light having a spectral width inputted from the light source section 30 or the like, and outputs output light having a predetermined spectral distribution. The tunable filter 100 includes a first optical system 110, a first polarization splitter 120, a second optical system 130, a spectroscopic section 140, a reflective spatial modulator device 150, a modulator device driver 156, a third optical system 160, and a second polarization splitter 162.

The input light 80 from the light source section 30 or the other optical systems enters the first optical system 110 of the tunable filter 100, is converted into a parallel light flux parallel to the optical axis, and is vertically inputted to the first polarization splitter 120. The first polarization splitter 120 splits this light into two linearly polarized light rays whose vibration directions are orthogonal to each other. Specifically, the first polarization splitter 120 splits the traveling direction of P polarized light and S polarized light to above and below in FIG. 1, for example. One example of the first polarization splitter 120 is a Wollaston prism. By adopting a Wollaston prism as the first polarization splitter 120, a higher extinction ratio is realized than that of the thin-film polarizing beam-splitter and a polarization filter. In FIG. 1, the traveling direction 70 of light is shown by an arrow, and the vibration direction 72 is represented by an arrow of both ways for P polarized light and by a black dot for S polarized light, with reference to the input/output surfaces of the first polarization splitter 120.

The P polarized light and the S polarized light of a parallel light flux outputted from the first polarization splitter 120 are inputted to the second optical system 130 respectively, and the two fluxes are converted into converged ones of which principal rays are parallel to the optical axis. The light outputted from the second optical system 130 is inputted to the pre-tilt compensation wavelength plate 132, and here, half of the pre-tilt phase of the reflective spatial modulator device 150 is compensated.

Here, the second optical system 130 is an output-side telecentric optical system by arranging the front-side focal plane of the second optical system 130 to match the polarization split point of the first polarization splitter 120. As a result, the principal rays of the P polarized light and the S polarized light outputted from the second optical system 130 are vertically inputted to the pre-tilt compensation wavelength plate 132 respectively. This helps prevent the retardation amount of the pre-tilt compensation wavelength plate 132 from fluctuating due to the angle at which the light flux passes. Furthermore, in the embodiment of FIG. 1, the input light is incident to the first polarization splitter 120 at a position that matches the optical axis of the second optical system 130.

The two light rays outputted from the pre-tilt compensation wavelength plate 132 are inputted to the spectroscopic section 140. The spectroscopic section 140 includes an input/output slit 142, a collimator 144, a wavelength dispersion spectroscopic element 146, and a camera optical system 148, and splits the two light rays into two spectral images corresponding to the two light rays and having spatial spread in one direction. Here, the input/output slit 142 is positioned on the rear-side focal plane of the second optical system 130. In addition, the input/output slit 142 and the wavelength dispersion spectroscopic element 146 are provided at the front-side focal position and the rear-side focal position of the collimator 144, respectively.

First, in the spectroscopic section 140, the light outputted from the pre-tilt compensation wavelength plate 132 is converged in the input/output slit 142. The input/output slit 142 gets narrow towards the spectroscopic direction of the wavelength dispersion spectroscopic element 146 and gets long towards the right-angular direction thereto. The two light rays having transmitted through the input/output slit 142 become a parallel light flux by means of the collimator 144, and inputted to the wavelength dispersion spectroscopic element 146. These two light rays are respectively split by the wavelength dispersion spectroscopic element 146 into two spectral images having spatial spread in one direction (i.e. in the direction orthogonal to the paper on which the drawing is drawn) based on the wavelength.

The reflective spatial modulator device 150 includes a first liquid crystal element array 152 and a second liquid crystal element array 154, and modulates and reflects linearly polarized light of each wavelength region for the two spectral images independently from each other. Here, the wavelength dispersion spectroscopic element 146, the first liquid crystal element array 152, and the second liquid crystal element array 154 are respectively provided on the front-side focal position and the rear-side focal position of the camera optical system 148. In addition, the first liquid crystal element array 152 is formed by a plurality of liquid crystal elements arranged in the direction vertical to the paper on which FIG. 1 is drawn. Likewise, the second liquid crystal element array 154 is formed by a plurality of liquid crystal elements arranged in the direction vertical to the paper on which FIG. 1 is drawn. Furthermore, the first liquid crystal element array 152 and the second liquid crystal element array 154 are arranged in the direction orthogonal to the direction in which the plurality of liquid crystal elements are arranged.

The two spectral images split by the wavelength dispersion spectroscopic element 146 are focused on the first liquid crystal element array 152 and the second liquid crystal element array 154 by the camera optical system 148. Specifically, a spectral image of S polarized light is focused on the first liquid crystal element array 152 in the direction of the array, and a spectral image of P polarized light is focused on the second liquid crystal element array 154 in the direction of the array. Here, since the camera optical system 148 is output-side telecentric, the principal rays of the two spectral images will be respectively vertically incident to the first liquid crystal element array 152 and the second liquid crystal element array 154. Since there is also no fluctuation in incident angle depending on the wavelength, the retardation generated by the first liquid crystal element array 152 and the second liquid crystal element array 154 will be accurate, being prevented from fluctuating due to the angle at which the light flux passes.

The modulator device driver 156 adjusts the retardation for each liquid crystal element, by adjusting the voltage to be applied to each of the plurality of liquid crystal elements of the first liquid crystal element array 152 and the second liquid crystal element array 154 independently from each other. As a result, the polarization state (generally speaking, the elliptically polarized state) of the light flux traveling back, after being reflected, the path to the first liquid crystal element array 152 and the second liquid crystal element array 154 is changed for each incident ray to a respective liquid crystal element. Here, since the input light to the first liquid crystal element array 152 and the second liquid crystal element array 154 is a spectral image spreading in the direction in which a plurality of liquid crystal elements are arranged, the polarization state of light can be modulated for each wavelength, by arranging the retardation of liquid crystal elements corresponding to the wavelength of the incident light. In addition, the first liquid crystal element array 152 and the second liquid crystal element array 154 operate independently from each other, and so the polarization property can be compensated if existing in the optical system.

As a result of reentry of the modulated light reflected by the reflective spatial modulator device 150 into the spectroscopic section 140 and the first polarization splitter 120, from among the modulated light, the output light in the wavelength region whose polarization direction has been modulated by the reflective spatial modulator device 150 and the output light in the wavelength region whose polarization direction is not modulated are split and outputted. The following details this.

First, the camera optical system 148 causes the two spectral images modulated and reflected by the first liquid crystal element array 152 and the second liquid crystal element array 154 to reenter the wavelength dispersion spectroscopic element 146, and the spectral images dispersed for each wavelength region are combined into two corresponding parallel light fluxes in the wavelength dispersion spectroscopic element 146. Here, the combined light from one of the spectral images corresponds to S polarized light split in the first polarization splitter 120, and this light includes S polarized light for a wavelength component whose polarization direction has not been modulated by the first liquid crystal element array 152, and includes P polarized light for a wavelength component whose polarization direction has been modulated by the first liquid crystal element array 152. The light from the other of the spectral images corresponds to P polarized light split in the first polarization splitter 120, and this light includes P polarized light for a wavelength component whose polarization direction has not been modulated by the second liquid crystal element array 154, and includes S polarized light for a wavelength component whose polarization direction has been modulated by the second liquid crystal element array 154. Here, please note that a minute retardation effect due to the pre-tilt compensation wavelength plate 132 is ignored for simplifying the explanation.

The two light fluxes combined by the wavelength dispersion spectroscopic element 146 are respectively focused on the input/output slit 142 by the collimator 144, transmitted through the input/output slit 142, passed through the pre-tilt compensation wavelength plate 132, and reenter the second optical system 130. The two light fluxes having reentered the second optical system 130 reenter the first polarization splitter 120 as parallel light flux. In the embodiment of FIG. 1, the positions on the end surface of the first polarization splitter 120 at which the two light fluxes reenter the first polarization splitter 120 respectively correspond to the positions from which the two linearly polarized light rays are split and outputted from the first polarization splitter 120.

The two parallel light fluxes that have reentered the first polarization splitter 120 are output as three light fluxes. Specifically, the wavelength component of P polarized light and the wavelength component of S polarized light whose polarization direction has not been modulated by the first liquid crystal element array 152 and the second liquid crystal element array 154 are combined into a single light flux by the first polarization splitter 120, to be the output light 82 traveling back from whence it came. With respect to the wavelength component from among the P polarized light separated by initial input to the first polarization splitter 120 (which is converted to S polarized light by polarization direction modulation by the second liquid crystal element array 154), and with respect to the wavelength component from among the S polarized light separated by initial input to the first polarization splitter 120 (which is converted to P polarized light by polarization direction modulation), the optical path is further curved by the first polarization splitter 120 to travel in outward spread as shown in FIG. 1.

P polarized light and S polarized light traveling in outward spread are focused by the first optical system 110, changed to parallel luminous fluxes by the third optical system 160, and inputted to the second polarization splitter 162. The third optical system 160 outputs the output light 84 by combining the P polarized light and the S polarized light. In the example of FIG. 1, the first optical system 110 and the third optical system 160 form an afocal optical system.

In the tunable filter 100, the spectrum of the output light 84 outputted from the second polarization splitter 162 changes by the retardation given by the first liquid crystal element array 152 and the second liquid crystal element array 154. Hence, the spectral distribution can be changed by the output of the modulator device driver 156 to enable the tunable filter 100 to function as a tunable filter. Note that in FIG. 1, the spectroscopic section 140 and the reflective spatial modulator device 150 form a zero dispersion spectroscope adopting a liquid crystal spatial modulator device.

A polarization split point by the first polarization splitter 120, a wavelength dispersing point by the wavelength dispersion spectroscopic element 146, and a polarization combining point by the second polarization splitter 162 are provided in conjugate relationship. Consequently, the light flux sectional area passing through the first polarization splitter 120, the wavelength dispersion spectroscopic element 146, and the second polarization splitter 162 can be minimized to reduce the size of these expensive elements. Furthermore, since the input light and the reentry light to the first polarization splitter 120, and the input light and the reentry light to the wavelength dispersion spectroscopic element 146 are parallel light fluxes, the locality of the polarization state modulation can be restrained during a process in which these first polarization splitter 120 and wavelength dispersion spectroscopic element 146 are passed through.

Figure 2:
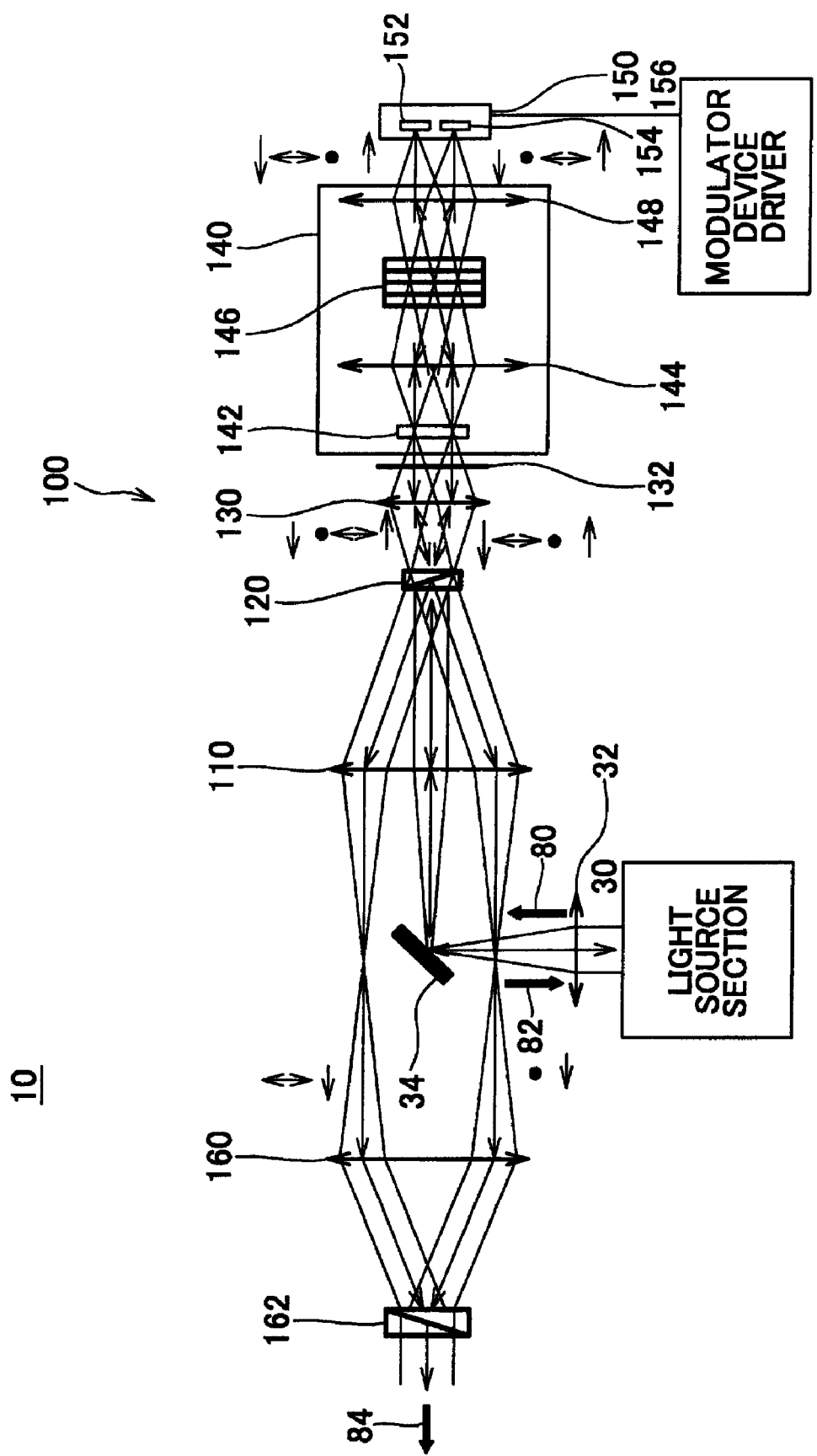
FIG. 2 shows an overview of a light source apparatus 10 which is an example of the embodiment.

FIG. 2 shows an overview of a light source apparatus 10 which is an example of the embodiment. In the following drawing, the constituting elements that are the same as the constituting elements shown in FIG. 1 are assigned the same reference numerals, to omit the corresponding explanation. The light source apparatus 10 in FIG. 2 corresponds to the tunable filter 100 to which the light source section 30, the relay optical system 32, and the fold mirror 34 are added.

The light source section 30 is a white light source having a continuous spectrum. The white light outputted from the light source section 30 passes through the relay optical system 32, is folded by the fold mirror 34, and is inputted to the tunable filter 100. By adjusting the relay optical system 32, the light flux transmitted through the first optical system 110 is adjusted to be a light flux parallel to the optical axis. The light source apparatus 10 outputs the output light 84 from the second polarization splitter 162. As stated above, the output from the modulator device driver 156 can change the spectral distribution of the output light 84 from the second polarization splitter 162, and therefore the light source apparatus 10 can function as a variable spectral light source apparatus. Note that the light source section 30 is not limited to a visible region white light source, as long as it has a continuous spectrum.

Figure 3:
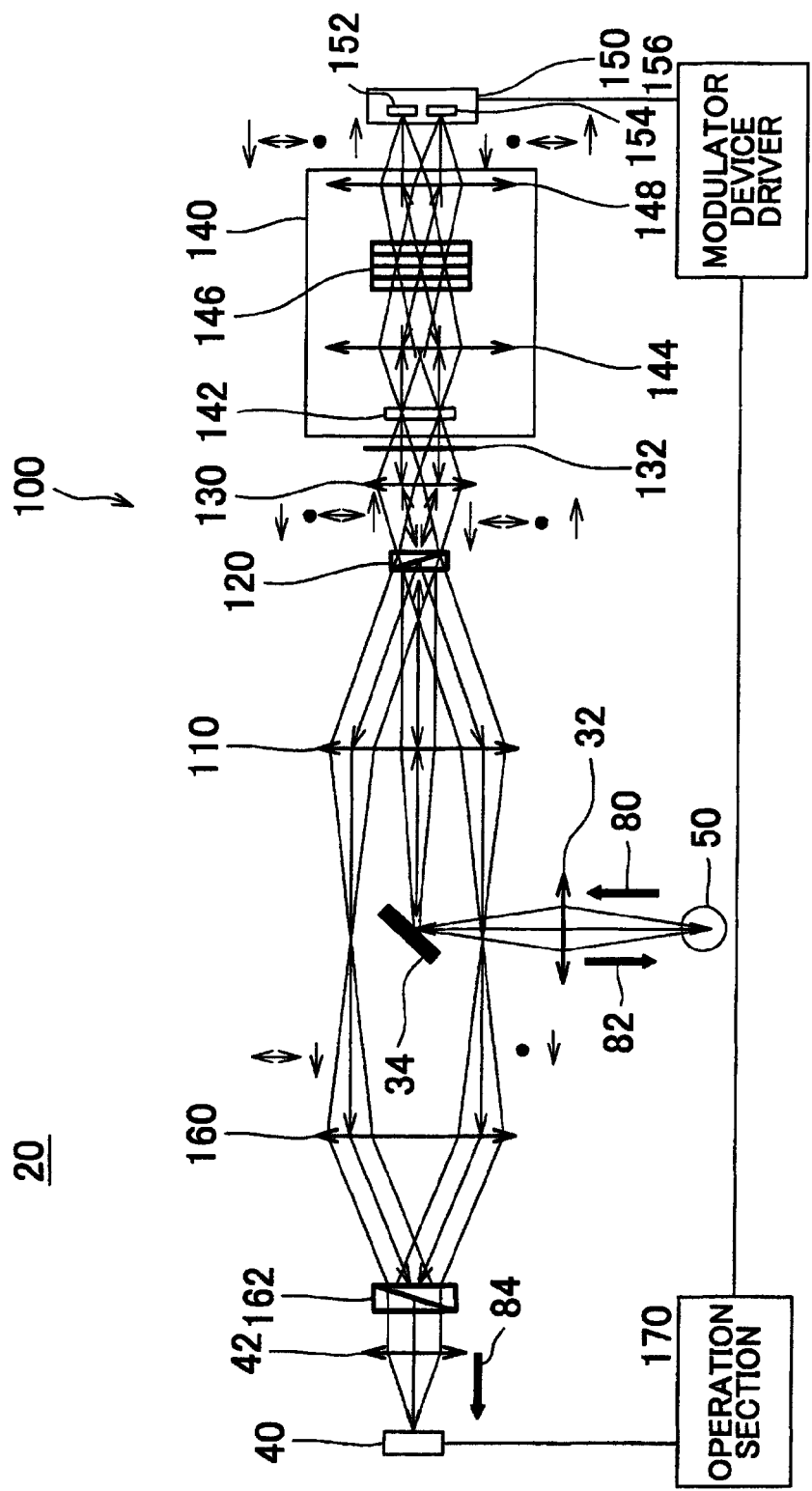
FIG. 3 shows an overview of a spectral distribution measuring apparatus 20 which is an example of the embodiment.

FIG. 3 shows an overview of a spectral distribution measuring apparatus 20 which is an example of the embodiment. The spectral distribution measuring apparatus 20 shown in FIG. 3 corresponds to the tunable filter 100 in FIG. 1 to which the relay optical system 32, the fold mirror 34, the output optical output optical system 42, the light amount measuring section 40, and the operation section 170 are added. The constitution of the other part of the spectral distribution measuring apparatus 20 is the same as the tunable filter 100 in FIG. 1, and so the explanation of the same part is omitted. The following only explains the differences.

The input light 80 outputted from the measurement object 50 (such as an object) passes through the relay optical system 32, is folded by the fold mirror 34, and is inputted to the tunable filter 100. By adjusting the relay optical system 32, the light flux transmitted through the first optical system 110 is adjusted to be a light flux parallel to the optical axis. The output light 84 from the second polarization splitter 162 is focused on the light amount measuring section 40 by the output optical system 42, so that the light amount measuring section 40 can measure the intensity of the output light 84.

Here, the modulator device driver 156 gives a predetermined amount of retardation to each liquid crystal element of the first liquid crystal element array 152 and the second liquid crystal element array 154, and causes the light amount measuring section 40 to measure the output light 84 from the second polarization splitter 162. This process is repeated by changing the retardation given to each liquid crystal element of the first liquid crystal element array 152 and the second liquid crystal element array 154, to cause the operation section 170 to calculate the relation between the amount of retardation for the wavelength region modulated by the reflective spatial modulator device 150 and the output light 84 from the second polarization splitter 162. As a result, the optical spectral distribution emitted from the measurement object 50 can be measured. This method is referred to as multiplex spectroscopy, among which Hadamard transform spectroscopy is a representative example.

For example, an arrangement may be made to perform modulation to change, into S polarized light, all the incident P polarized light (or a prescribed % thereof) for a liquid crystal element of the first liquid crystal element array 152 corresponding to a wavelength, and to change, into P polarized light, all the incident S polarized light (or a prescribed % thereof) for a liquid crystal element of the second liquid crystal element array 154 corresponding to the wavelength, and to perform no modulation to the other wavelengths. If such an arrangement is made, only light in the wavelength having been modulated will be detected by the light amount measuring section 40. If this measurement is performed by sequentially changing the wavelength to be modulated, it is possible to measure the spectral distribution of the incident light. The spectral distribution measuring apparatus 20 does not include any mechanical movable section, and has simple mechanism.

The above example uses a Wollaston prism. However, a Nomarski prism, which is an improvement from the Wollaston prism, can achieve the same effect.

The above example uses a reflective spatial modulator device 150. However, a transmissive spatial modulator device may be used. In such a case, instead of using the reflective spatial modulator device 150 of FIG. 1, a transmissive spatial modulator device is provided to perform modulation and transmission of linearly polarized light in each wavelength region for two spectral images independently from each other. The same configuration as that of the spectroscopic section 140 is provided in a conjugate relationship with the spectroscopic section 140 and provides the same configuration as that of the first polarization splitter 120 in a conjugate relationship with the first polarization splitter 120. In such a case, too, the input light to the first polarization splitter 120 and the polarization splitter in a conjugate relationship therewith as well as the wavelength dispersion spectroscopic element 146 of the spectroscopic section 140 and the wavelength dispersion spectroscopic element in a conjugate relationship therewith are parallel light fluxes. As a result, the output light can accurately reflect the modulation in the transmissive spatial modulator device.

Figure 4:
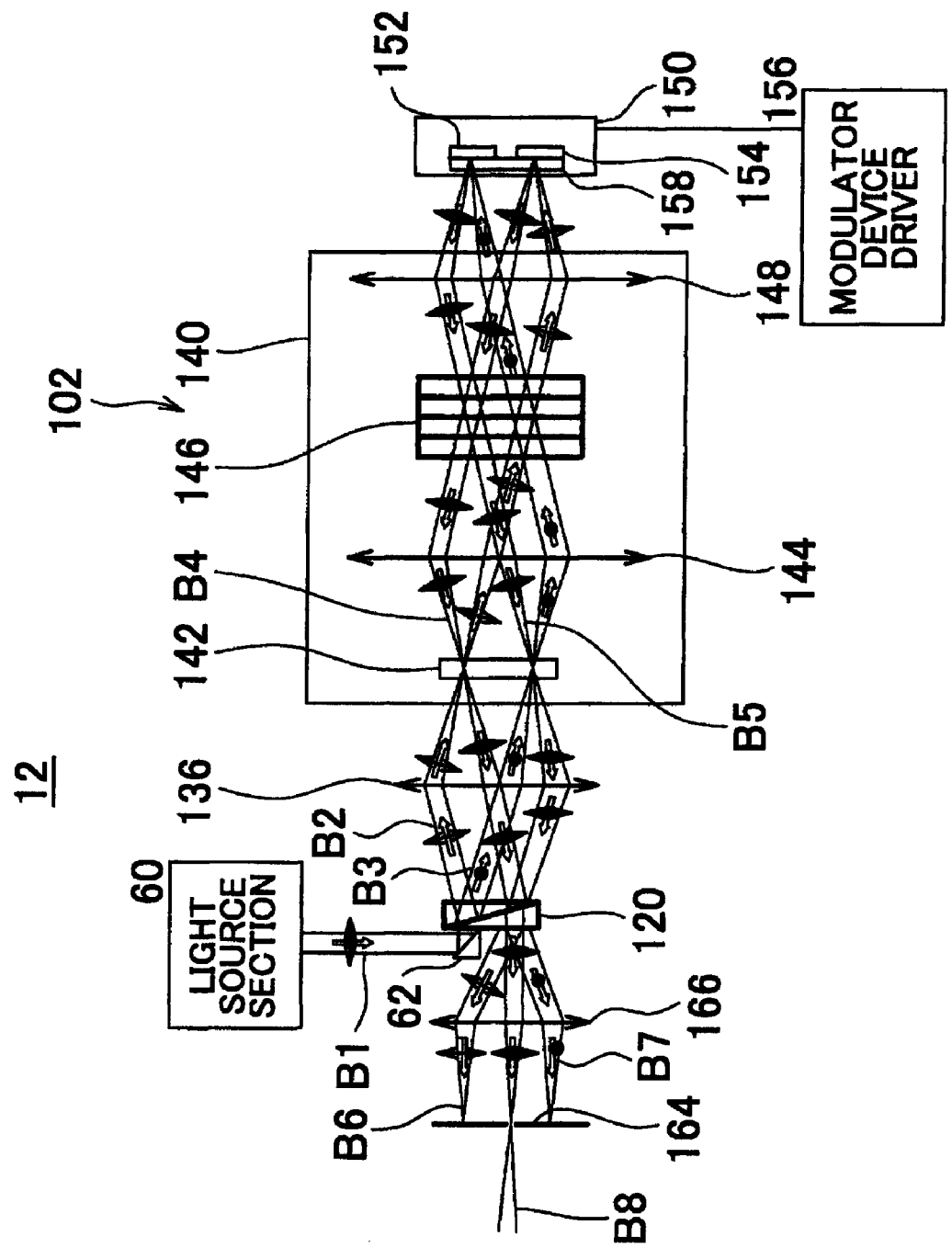
FIG. 4 shows an overview of a light source apparatus 12 which is another example of the embodiment.

FIG. 4 shows an overview of a light source apparatus 12 which is another example of the embodiment. The light source apparatus 12 of FIG. 4 includes a light source section 60, a mirror 62, and a tunable filter 102. The tunable filter 102 includes a first polarization splitter 120, a first optical system 136, a spectroscopic section 140, a reflective spatial modulator device 150, a modulator device driver 156, a second optical system 166, and a pinhole 164.

The light source section 60 in FIG. 4 can be considered as a point light source from the viewpoint of geometrical optics, as well as being a supercontinuum light source having a characteristic of a continuous spectral light source. The parallel light flux B1 outputted from the light source section 60 includes P polarized light and S polarized light having two mutually orthogonal vibration directions, which are incident to the first polarization splitter 120 after their directions are curved by the mirror 62. Here, the mirror 62 may not be provided, if it is not necessary depending on the arrangement. Note that in FIG. 4, the black dot and the arrow of both ways assigned on the light rays respectively indicate mutually right-angular vibration directions of the polarizations. A light ray on which these two marks are assigned corresponds to a light ray that has both polarization components.

The first polarization splitter 120 splits the input light and outputs the result as output light having two linearly polarized components orthogonal to each other. An example of the first polarization splitter 120 is a Wollaston prism formed by a birefringence crystal such as calcite, which generates a high extinction ratio (e.g. about 100000:1). A Nomarski prism may also be used instead of a Wollaston prism. Note that the first polarization splitter 120 is slightly tilted not to cause the surface reflection light flux to return to the light source point in the light source section 60.

The parallel light flux B1 is inputted to a position deviated from the optical axis in the optical system such as the first optical system 136. In the embodiment of FIG. 4, the parallel light flux B1 is inputted to a position deviated into the direction (i.e. upper direction in the drawing) orthogonal to the optical axis and within a plane including the principal ray axis of two linearly polarized light rays split by the first polarization splitter 120.

The parallel light flux B1 is divided by the first polarization splitter 120 into the light fluxes B2 and B3 respectively corresponding to polarized light components that are orthogonal to each other, thereby traveling into different directions and forming a predetermined angle therebetween. Next, the first optical system 136 having a positive power is used to focus each of these light fluxes B2 and B3 on substantially a point image. Here, it is desirable to cause the split point between the light fluxes B2 and B3, formed in the first polarization splitter 120, to match the focal plane of the first optical system 136. By doing so, the two principal rays respectively of the light fluxes B2 and B3, having passed through the first optical system 136, will be parallel to each other.

The two light rays outputted from the first optical system 136 will be inputted to the spectroscopic section 140. The spectroscopic section 140 includes an input/output slit 142, a collimator 144, and a wavelength dispersion spectroscopic element 146, and a camera optical system 148, and splits the two light rays into two spectral images having spatial spread in one direction.

The input/output slit 142 is located at a point image position for the first optical system 136. When the light source section 60 is a supercontinuum light source or a laser light source, light can be focused into substantially one point, and so it is not necessary to provide the input/output slit 142. However, it is preferable that the input/output slit 142 be provided, for preventing redundant light from entering the spectroscopic section 140. One example of the spectroscopic section 140 is a wavelength dispersion type. FIG. 4 shows a wavelength dispersion spectroscope. One example of the wavelength dispersion spectroscopic element 146 is a grating, but may be a wavelength dispersion element such as a prism instead of the grating if it is more suitable.

The collimator 144 is provided between the input/output slit 142 and the wavelength dispersion spectroscopic element 146. In this case, it is preferable that the front-side focal position of the collimator 144 match the rear-side focal position of the first optical system. By adopting such an arrangement, the two light fluxes incident to the collimator 144 will be parallel light fluxes to each other, to be inputted to the wavelength dispersion spectroscopic element 146. As a result, the locality of the polarization state modulation can be restrained during a process in which the wavelength dispersion spectroscopic element 146 is passed through.

The two spectral images formed by the spectroscopic section 140 will be two lines substantially parallel to each other. A reflective spatial modulator device 150 of a two-column array configuration including a first liquid crystal element array 152 and a second liquid crystal element array 154 which respectively correspond to the linear spectral image positions is provided. An example of the reflective spatial modulator device 150 is a reflective liquid crystal element. A modulator device driver 156 is connected to the reflective spatial modulator device 150, to control the voltage applied to each liquid crystal element. Although not shown in the drawing, a control signal to the modulator device driver 156 is provided from a control apparatus such as an external personal computer.

It is desirable that the optical system of the spectroscopic section 140 be designed to align, as parallel as possible, the principal ray of each wavelength element light flux of the two spectral images incident to a respective one of the liquid crystal elements of the reflective spatial modulator device 150. This is realized by positioning the split point of the principal ray of each wavelength of the wavelength dispersion spectroscopic element 146, on or in the vicinity of the front focal plane of the camera optical system 148. As a result, the condition of the incident angle for the first liquid crystal element array 152 and the second liquid crystal element array 154 aligned on a plane can be matched, and variations in retardation characteristics due to variations in incident angles can also be restrained. It is also possible to match the directions of the stray light, to facilitate the treatment on the stray light. It is also preferable to provide the reflective spatial modulator device 150 on the rear focal plane of the camera optical system 148.

On the other hand, the principal rays of the two spectral images will be obliquely incident to the plane orthogonal to the direction in which the plurality of liquid crystal elements of the first liquid crystal element array 152 (and the second liquid crystal element array 154) are arrayed at an incident angle of non-zero with respect to the first liquid crystal element array 152 and the second liquid crystal element array 154. As a result, the principal rays of the two spectral images incident to the first liquid crystal element array 152 and the second liquid crystal element array 154 travel in an optical path different from the optical path of the principal rays of the two spectral images reflected at the first liquid crystal element array 152 and the second liquid crystal element array 154.

The pre-tilt compensation wavelength plate 158 is attached to the light input/output plane of the reflective spatial modulator device 150 in advance. The pre-tilt compensation wavelength plate 158 is also referred to as a retardation compensation plate, and cancels out initial retardation remaining in small amount in the liquid crystal element and retardation possibly occurring due to the optical system between the first polarization splitter 120 and the reflective spatial modulator device 150. Here, care should be taken so that the amount of reflection light at the attachment surface, which has a possibility of turning into stray light, be restrained to a predetermined value or below. The attachment surface may also be provided with an antireflective film. In this case, a pre-tilt compensation wavelength plate 158 may be prepared commonly for the first liquid crystal element array 152 and the second liquid crystal element array 154. Alternatively, two pre-tilt compensation wavelength plates 158, respectively made optimal for two split linearly polarized light flux paths, may be attached on the first liquid crystal element array 152 and the second liquid crystal element array 154, respectively.

When the reflective spatial modulator device 150 reflects the spectral light flux of a spectral image, retardation occurs according to the voltage independently applied to each liquid crystal element of the first liquid crystal element array 152 and the second liquid crystal element array 154. Accordingly, the polarization state of the spectral light flux after reflection at the reflective spatial modulator device 150 is generally elliptically polarized light. By causing predetermined retardation independently for each wavelength element of a spectral image to produce an elliptically polarized light using the reflective spatial modulator device 150, the spectral attenuation effect is generated when passing the first polarization splitter 120 again to endow the output light with a predetermined spectral characteristic.

The polarization state of the light fluxes B2 and B3 is greatly different between When the fluxes are incident to the wavelength dispersion spectroscopic element 146 and when the fluxes are reentering the wavelength dispersion spectroscopic element 146 after being reflected at the reflective spatial modulator device 150. The spectral transmission characteristic of the wavelength dispersion spectroscopic element 146 normally has polarization dependency, which is particularly distinguished for the gratings. For eliminating the spectral characteristic polarization dependency of this wavelength dispersion spectroscopic element 146, the spectral attenuation amount by the first polarization splitter 120 can be varied when the light fluxes B4 and B5 pass the first polarization splitter 120 again to cancel out the spectral characteristic polarization dependency of the wavelength dispersion spectroscopic element 146. This is realized by adding, to the light fluxes B4 and B5, the retardation amount different for a predetermined value between the first liquid crystal element array 152 and the second liquid crystal element array 154.

The light flux reflected at the reflective spatial modulator device 150 undergoes the wavelength combining effect while traveling back in the wavelength dispersion spectroscopic element 146, to return to the two white light fluxes B4 and B5. Then, on the input/output slit 142, the light fluxes are focused at the same position at which they are inputted.

The plane that is vertical to the plane including the straight line connecting the centers of the two spots on the aperture of the input/output slit 142 and the principal ray of the light fluxes (focused light fluxes) focused on the two spots, and that includes the centers of the two spots is referred to as an input/output slit surface. The incident angle of the principal ray of the light fluxes B2 and B3 is tilted so that, when the principal rays of the light fluxes B2 and B3 are incident to the spots of the input/output slit 142 respectively, the respective principal rays can be incident to the input/output slit surface at an angle larger than the angle determined by the focus light NA of the focused light flux. By doing so, the light fluxes B2 and B3 from the input/output slit 142 to the reflective spatial modulator device 150 will be split from the light fluxes B4 and B5 after being reflected at the reflective spatial modulator device 150 and until returning to the input/output slit 142, except for in the vicinity of the input/output slit 142 and in the vicinity of the reflecting point of the reflective spatial modulator device 150. This is evident also from the fact that the reflection surfaces of the input/output slit 142 and the reflective spatial modulator device 150 are in conjugate relation. Since it is preferable to have a small angular distribution of light rays passing through a liquid crystal element and to have a small angle between the incident light flux and the reflection light flux, it is possible to reduce the detrimental effect of the light angular distribution by restraining the focus light flux NA to be sufficiently small and by restraining the light flux incident tilt angle to be as small as possible.

The light flux outputted from the input/output slit 142 reenters the first polarization splitter 120 after being collimated by the first optical system 136. In this case, the two light fluxes B4 and B5 of the modulated light are caused to reenter the first polarization splitter 120 at a position spatially different from the position from which the input light split into the two linearly polarized light fluxes B2 and B3 is outputted.

In this case, by causing the focal plane of the first optical system 136 to match the polarization split point of the first polarization splitter 120 as stated above, the principal rays of the two light fluxes B2 and B3 incident to the input/output slit 142 will be parallel to each other, and the principal rays of the two light fluxes B4 and B5 outputted from the input/output slit 142 will also be parallel to each other. The two light fluxes B4 and B5 will intersect each other in the first polarization splitter 120, at the same time when subjected to the collimation effect from the first optical system 136. Here, as stated above, since the light fluxes B2 and B3 and the light fluxes B4 and B5 are split from each other, the position of the first polarization splitter 120 at which the light fluxes B4 and B5 are incident is different from the position at which the light fluxes B2 and B3 are incident.

The two white light fluxes B4 and B5 having returned to the first polarization splitter 120 are divided into a component deflected to a direction parallel to the direction at which the light flux B1 emitted from the light source section 60 is initially incident to the first polarization splitter 120, and a component that passes without being subjected to the deflection. The deflected components respectively of the two returned white light fluxes substantially overlap with each other, and are outputted from the first polarization splitter 120 as substantially a single light flux, which is referred to as an output light flux B8. The polarized component light not subjected to the latter deflection travels into two different directions after passing through the polarization splitter, which are referred to as discarded light fluxes B6 and B7. Here, since the position at which the light fluxes B4 and B5 are incident to the first polarization splitter 120 is different from the position at which the light fluxes B2 and B3 are incident as stated above, the output light flux B8 having passed through the first polarization splitter 120 is prevented from directly returning to the light source section 60, to maintain the stable operation of the light source section 60.

A second optical system 166 having a positive power is provided next to the first polarization splitter 120 along the optical path, to particularly focus the output light flux B8. The discarded light fluxes B6 and B7 may be either incident or not incident to the second optical system 166. A pinhole 164 is placed at the focal point of the output light flux B8, to cause only the output light flux B8 to pass, thereby obtaining the light flux having a predetermined spectrum.

Note that instead of providing the second optical system 166 and the pinhole 164, simply an aperture may be provided to cause only the output light flux B8 to pass. In this case, compared to when the second optical system 166 and the pinhole 164 are provided, the light flux to be taken out will cause stray light to some extent. However if this does not pose a problem, the configuration can still obtain a light flux having a predetermined spectrum.

In the embodiment of FIG. 4, the parallel light flux B1 is inputted to a position deviated into a direction (i.e. upper direction in the drawing) orthogonal to the optical axis and within a plane including the principal ray axis of the two linearly polarized light rays split by the first polarization splitter 120. Thus, the output light flux B8 will be aligned (up and down in the drawing) with the parallel light flux B1 in the direction orthogonal to the optical axis and within the plane including the principal ray axis of the two linearly polarized light rays split by the first polarization splitter 120. However, the positional relationship between the parallel light flux B1 and the parallel light flux B1 is not limited to this. Another example is possible in which the parallel light flux B is inputted to a position (front or back of the paper on which FIG. 4 is drawn) deviated from the optical axis in the direction normal to the plane including the principal ray axis of the two linearly polarized light rays split by the first polarization splitter 120. Accordingly, the output light flux B8 is aligned with the parallel light flux B1 in the direction normal to the plane including the principal ray axis of the two linearly polarized light rays split by the first polarization splitter 120 (in front and back of the paper in which FIG. 4 is drawn).

Figure 5:
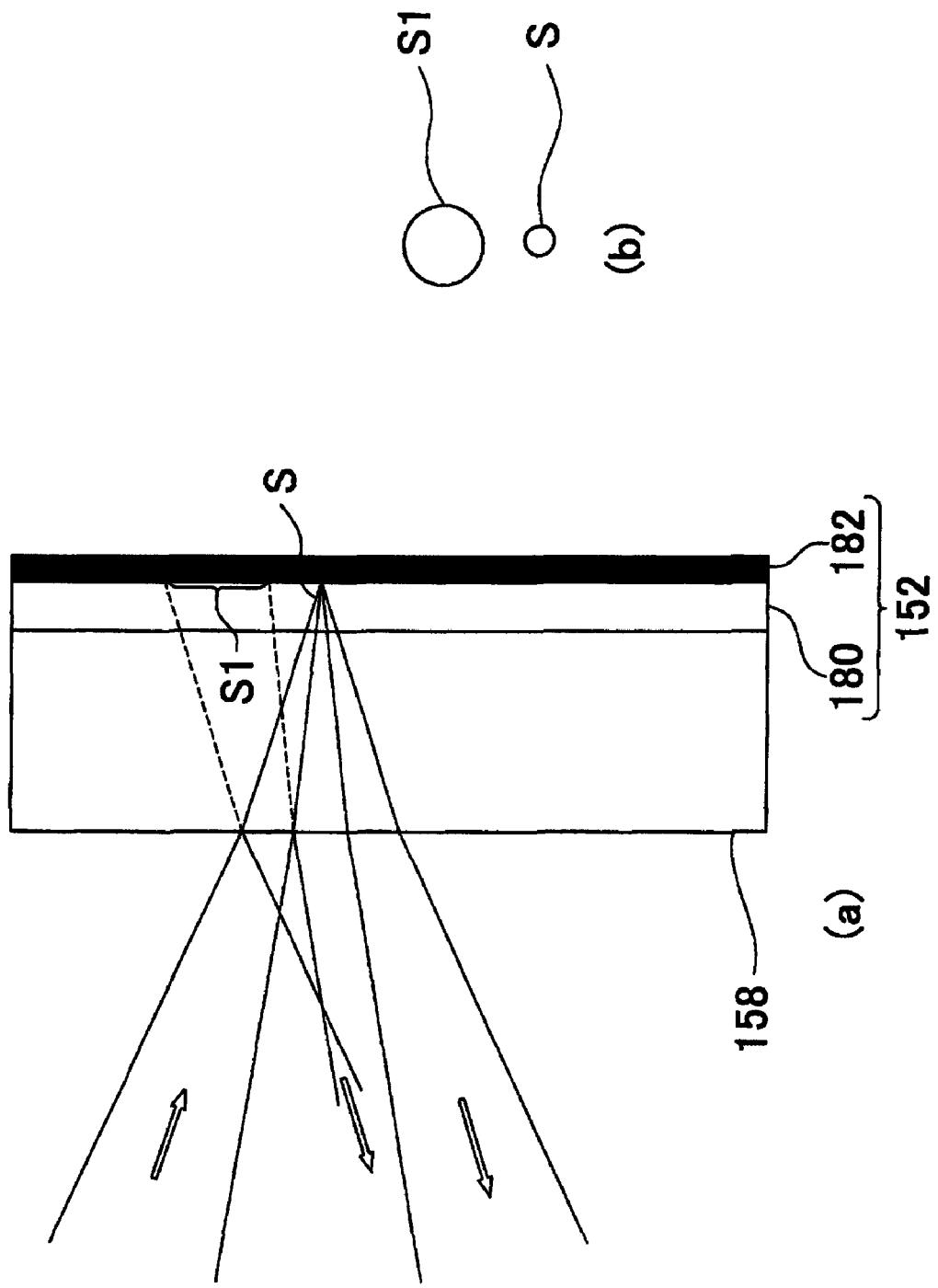
FIG. 5 shows a partially enlarged overview of a first liquid crystal element array 152.

FIG. 5 shows a partially enlarged overview of a first liquid crystal element array 152. As shown in (a) of FIG. 5, a first liquid crystal element array 152 includes a pre-tilt compensation wavelength plate 158, a liquid crystal unit 180, and a mirror 182 in the stated order.

The position of the first liquid crystal element array 152 of FIG. 5 is determined so that the entire spectral image is formed and reflected in the predetermined wavelength region on the mirror surface of the mirror 182 of the first liquid crystal element array 152. This arrangement enables the light fluxes B2 and B3 to be reflected to return to the inside of the spectroscopic section 140. Note that since the configuration of the second liquid crystal element array 154 is the same as the configuration of the first liquid crystal element array 152, the following does not explain the second liquid crystal element array 154.

The following explains a method of separating, from the output light, stray light attributable to the reflected light generated on the surface of the optical element. The pre-tilt compensation wavelength plate 158, provided for the reason stated above, will generate light reflection on the surface of the pre-tilt compensation wavelength plate 158, which may result in stray light. For separating the stray light, it is desirable to increase the thickness of the pre-tilt compensation wavelength plate 158.

As shown in (a) of FIG. 5, the incident light flux to the first liquid crystal element array 152 passes through the pre-tilt compensation wavelength plate 158 and the liquid crystal unit 180, forms a spot S on the surface of the mirror 182, is reflected at the surface of the mirror 182, and returns as reflection light to become output light. A part of this incident light flux is reflected at the surface of the pre-tilt compensation wavelength plate 158, and returns as reflection light to become stray light. Accordingly, the reflection light reflected at the surface of the pre-tilt compensation wavelength plate 158 may be separated from the reflection light reflected at the mirror 182, so as to separate the stray light.

For achieving this, the thickness of the pre-tilt compensation wavelength plate 158 is increased so that the reflection light flux at the surface of the pre-tilt compensation wavelength plate 158 is separated as shown by the cross section S1 projected on the surface of the mirror 182 and the spot S, as shown in (b) of FIG. 5. By doing so, as shown in FIG. 4, the pinhole 164 positioned in conjugate relationship with the surface of the mirror 182 enables only the output light flux B8 to pass, while blocking the surface reflection light flux of the pre-tilt compensation wavelength plate 158, thereby contributing to a reduction in stray light.

Note that FIG. 5 does not draw the internal structure of the liquid crystal, with only mention of a liquid crystal section 180. When the pre-tilt compensation wavelength plate 158 is not attached to the first liquid crystal element array 152 and the second liquid crystal element array 154, the pre-tilt compensation wavelength plate 158 in FIG. 5 can be seen as replacement of a cover glass of the first liquid crystal element array 152 and the second liquid crystal element array 154. FIG. 5 does not draw the detailed structure of the liquid crystal, and the liquid crystal section 180 includes a cover glass, a liquid crystal layer, and so on.

Figure 6:
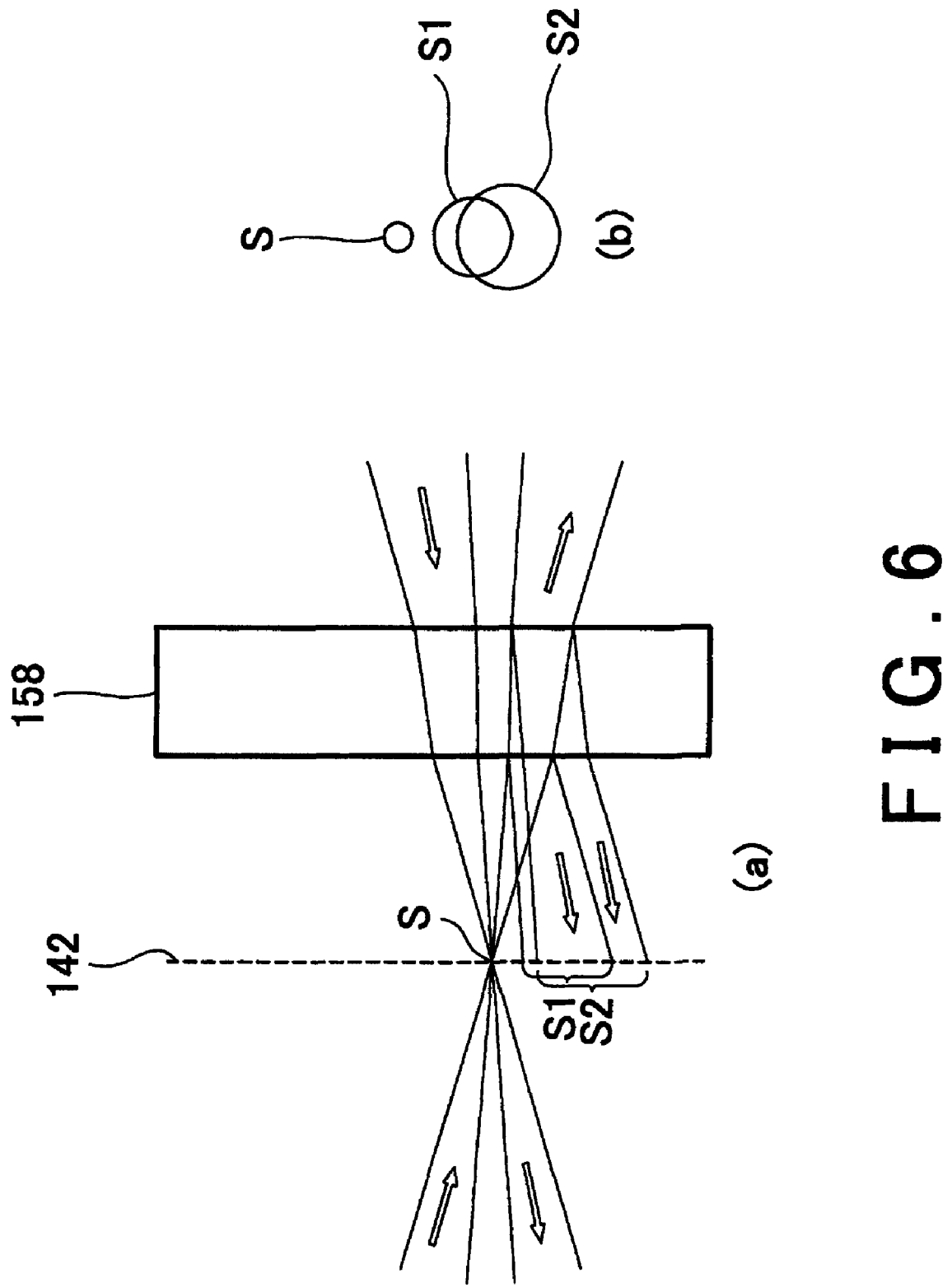
FIG. 6 shows an example in which a pre-tilt compensation wavelength plate 158 is provided at the rear side of an input/output slit 142.

FIG. 6 shows an example in which a pre-tilt compensation wavelength plate 158 is provided at the rear side of an input/output slit 142. As shown in (a) of FIG. 6, the pre-tilt compensation wavelength plate 158 may not be attached on the light input/output surfaces of the first liquid crystal element array 152 and the second liquid crystal element array 154. Instead, it may be independently placed in the vicinity of the input/output slit 142. In this case, the incident light is focused on the surface of the input/output slit to form a spot S. On the other hand, a part of this incident light is reflected at the front and rear surfaces of the pre-tilt compensation wavelength plate 158, to return as reflection light to become stray light. Accordingly, these reflection light rays may be separated from the output light, so as to separate the stray light.

For achieving this, as shown in (b) of FIG. 6, the surfaces of the input/output slit 142 and the pre-tilt compensation wavelength plate 158 may be separated from each other, in the amount that S and S1, and S and S2 are separated from each other, respectively, where S1 represents the projected cross section of the reflected light reflected at the front surface of the pre-tilt compensation wavelength plate 158 onto the input/output slit surface, and S2 represents the projected cross section of the reflected light reflected at the rear surface of the pre-tilt compensation wavelength plate 158. By doing so, as shown in FIG. 4, the pinhole 164 (provided in conjugate relationship with the input/output slit surface) enables only the output light flux B8 to pass, while blocking the reflected light flux on the front and rear surfaces of the pre-tilt compensation wavelength plate 158. The same relation is also satisfied when the pre-tilt compensation wavelength plate 158 is provided on the front side of the input/output slit 142.

A supercontinuum light source is used as a light source, in the above explanation. However, the feature of the present invention can be obtained when a different laser light source is used. However, the invention is particularly effective when a supercontinuum light source is used.

According to the embodiments shown in FIG. 1-FIG. 6, both of the P polarized light and the S polarized light in the input light can be used to obtain the output light having a predetermined spectral distribution. In this case, each wavelength region of P polarized light and each wavelength region of S polarized light can be modulated independently from each other, to vary the ratio between the P polarized light and the S polarized light for each wavelength region. Accordingly, the polarization property of the measurement target (e.g. optical thin film) can be measured. Furthermore, the polarization dependency can be independently compensated in the optical system of P polarized light and S polarized light.

Moreover, since the light entering and reentering the first polarization splitter 120 and the wavelength dispersion spectroscopic element 146 is a parallel light flux, it is possible to restrain the modulation in the direction of the polarization while the first polarization splitter 120 and the wavelength dispersion spectroscopic element 146 are being passed through. As a result, the output light can accurately reflect the modulation at the reflective spatial modulator device 150.

According to the embodiment of FIG. 4, two light fluxes of the modulated light are caused to reenter the first polarization splitter 120, at a position spatially different from the position from which the input light, split into two linearly polarized light rays, is outputted. Therefore, the light flux that has reentered the first polarization splitter 120 is prevented from directly returning to the light source section 60, to prevent the light source section 60 from performing in an unstable manner. Furthermore, according to the embodiments of FIG. 5 and FIG. 6, the stray light due to reflection at an optical element surface can be reduced, to realize a high extinction ratio.

In the above, the present invention has been described by way of embodiments. However, it is needless to say that the technical scope of the present invention should not be limited by the above-described embodiment. It should be understood that those skilled in the art might make many changes and substitutions without departing from the spirit and the scope of the present invention. It is obvious from the appended claims that embodiments with such modifications also belong to the scope of the present invention.

What is claimed is:

1. A tunable filter comprising:
    a polarization splitter operable to split input light into two linearly polarized orthogonal light rays;
    a wavelength dispersion spectroscopic element operable to split the two linearly polarized light rays split by the polarization splitter, into two spectral images having spatial spread in one direction, the two spectral images corresponding to the two linearly polarized light rays; and
    a reflective spatial modulator device operable to modulate and reflect linearly polarized light in each wavelength region for the two spectral images independently from each other, wherein
    the modulated light reflected at the reflective spatial modulator device reenters the wavelength dispersion spectroscopic element and the polarization splitter, thereby splitting and outputting the modulated light, as output light in a wavelength region modulated by the reflective spatial modulator device and output light in a wavelength region not modulated,
    input light and reentered light to the polarization splitter and input light and reentered light to the wavelength dispersion spectroscopic element are parallel light fluxes, and
    principal rays of the two spectral images are incident vertically to the reflective spatial modulator device.

2. The tunable filter according to claim 1, further comprising:
    a pair of optical systems provided between the polarization splitter and the wavelength dispersion spectroscopic element, so that a rear-side focal position of one optical system of the pair matches a front-side focal position of the other optical system of the pair; and
    an optical system provided between the wavelength dispersion spectroscopic element and the reflective spatial modulator device, the optical system provided with the wavelength dispersion spectroscopic element at a front-side focal plane and the reflective spatial modulator device at a rear-side focal plane.

3. The tunable filter according to claim 2 further comprising an input/output slit provided at a rear-side focal plane of the one optical system of the pair, the two linearly polarized light rays being inputted to and outputted from the input/output slit.

4. The tunable filter according to claim 3, wherein a polarization split point of the polarization splitter matches a front-side focal plane of the one optical system of the pair.

5. The tunable filter according to claim 4, wherein the polarization splitter is either a Wollaston prism or a Nomarsky prism.

6. The tunable filter according to claim 1, wherein two light fluxes of modulated light reenter the polarization splitter, at a position spatially different from a position from which input light, split into two linearly polarized light rays, is outputted.

7. The tunable filter according to claim 6, further comprising:
    a pair of optical systems provided between the polarization splitter and the wavelength dispersion spectroscopic element, so that a rear-side focal position of one optical system of the pair matches a front-side focal position of the other optical system of the pair; and
    an optical system provided between the wavelength dispersion spectroscopic element and the reflective spatial modulator device, the optical system provided with the wavelength dispersion spectroscopic element at a front-side focal plane and the reflective spatial modulator device at a rear-side focal plane.

8. The tunable filter according to claim 7, further comprising an input/output slit provided at a rear-side focal plane of the one optical system of the pair, the two linearly polarized light rays being inputted to and outputted from the input/output slit.

9. The tunable filter according to claim 8, wherein a polarization split point of the polarization splitter matches a front-side focal plane of the one optical system of the pair.

10. The tunable filter according to claim 9, wherein an angle formed between a normal line of an input/output slit surface and a principal ray of focused light fluxes of the two linearly polarized light rays focused on the input/output slit is larger than an angle determined by a focus light NA of the focused light fluxes, where the input/output slit surface is vertical to a plane including the principal ray of the focused light fluxes and a straight line connecting centers of two spots on which the two linearly polarized light rays are focused, and includes the straight line connecting the centers of the two spots.

11. A tunable filter comprising:
    a polarization splitter operable to split input light into two linearly polarized orthogonal light rays;
    a wavelength dispersion spectroscopic element operable to split the two linearly polarized light rays split by the polarization splitter, into two spectral images having spatial spread in one direction, the two spectral images corresponding to the two linearly polarized light rays;
    a reflective spatial modulator device operable to modulate and reflect linearly polarized light in each wavelength region for the two spectral images independently from each other;
    a pair of optical systems provided between the polarization splitter and the wavelength dispersion spectroscopic element, so that a rear-side focal position of one optical system of the pair matches a front-side focal position of the other optical system of the pair;
    an optical system provided between the wavelength dispersion spectroscopic element and the reflective spatial modulator device, the optical system provided with the wavelength dispersion spectroscopic element at a front-side focal plane and the reflective spatial modulator device at a rear-side focal plane; and
an input/output slit provided at a rear-side focal plane of the one optical system of the pair, the two linearly polarized light rays being inputted to and outputted from the input/output slit,
wherein the modulated light reflected at the reflective spatial modulator device reenters the wavelength dispersion spectroscopic element and the polarization splitter, thereby splitting and outputting the modulated light, as output light in a wavelength region modulated by the reflective spatial modulator device and output light in a wavelength region not modulated,
input light and reentered light to the polarization splitter and input light and reentered light to the wavelength dispersion spectroscopic element are parallel light fluxes,
two light fluxes of modulated light reenter the polarization splitter, at a position spatially different from a position from which input light, split into two linearly polarized light rays, is outputted
a polarization split point of the polarization splitter matches a front-side focal plane of the one optical system of the pair,
an angle formed between a normal line of an input/output slit surface and a principal ray of focused light fluxes of the two linearly polarized light rays focused on the input/output slit is larger than an angle determined by a focus light NA of the focused light fluxes, where the input/output slit surface is vertical to a plane including the principal ray of the focused light fluxes and a straight line connecting centers of two spots on which the two linearly polarized light rays are focused, and includes the straight line connecting the centers of the two spots, and
in the polarization splitter, the input light is inputted to a position deviated from an optical axis of the one optical system of the pair.

12. The tunable filter according to claim 11, wherein principal rays of the two spectral images are incident to the reflective spatial modulator device at a tilted angle.

13. The tunable filter according to claim 12, wherein the polarization splitter is either a Wollaston prism or a Nomarsky prism.

14. A light source apparatus comprising:
the tunable filter according to claim 1; and
a light source section operable to input parallel light to the tunable filter.

15. A spectral distribution measuring apparatus comprising:
the tunable filter according to claim 1; and
a light amount measuring section operable to measure output light from the tunable filter,
wherein a spectral distribution of input light inputted to the tunable filter is measured based on a wavelength region modulated by the reflective spatial modulator device and an intensity of the output light measured by the light amount measuring section.

16. A tunable filter comprising:
a first polarization splitter operable to split input light into two linearly polarized orthogonal light rays;
a first wavelength dispersion spectroscopic element operable to split the two linearly polarized light rays split by the first polarization splitter, into two spectral images having spatial spread in one direction, the two spectral images corresponding to the two linearly polarized light rays;
a transmissive spatial modulator device operable to modulate and transmit linearly polarized light in each wavelength region for the two spectral images independently from each other;
a second wavelength dispersion spectroscopic element that is provided in conjugate relation with the first wavelength dispersion spectroscopic element, and that is operable to focus the two spectral images from the transmissive spatial modulator device, respectively into two light fluxes;
a second polarization splitter that is provided in conjugate relation with the first polarization splitter, and that is operable to split and output the two light fluxes from the second wavelength dispersion spectroscopic element, as output light in a wavelength region modulated by the transmissive spatial modulator device and output light in a wavelength region not modulated, to be outputted;
a first pair of optical systems provided between the first polarization splitter and the first wavelength dispersion spectroscopic element, so that a rear-side focal position of one optical system of the pair matches a front-side focal position of the other optical system of the pair;
a first optical system provided between the first wavelength dispersion spectroscopic element and the transmissive spatial modulator device, the first optical system provided with the first wavelength dispersion spectroscopic element at a front-side focal plane and the transmissive spatial modulator device at a rear-side focal plane;
a second pair of optical systems provided between the second wavelength dispersion spectroscopic element and the second polarization splitter, so that a rear-side focal position of one optical system of the pair matches a front-side focal position of the other optical system of the pair; and
a second optical system provided between the transmissive spatial modulator device and the second wavelength dispersion spectroscopic element, the second optical system provided with the transmissive spatial modulator device at a front-side focal plane and the second wavelength dispersion spectroscopic element at a rear-side focal plane,
wherein input light to the first polarization splitter, the first wavelength dispersion spectroscopic element, the second wavelength dispersion spectroscopic element, and the second polarization splitter is a parallel light flux, and
principal rays of the two spectral images are incident vertically to the transmissive spatial modulator device.

17. A light source apparatus comprising:
the tunable filter according to claim 16; and
a light source section operable to input parallel light to the tunable filter.

18. A spectral distribution measuring apparatus comprising:
the tunable filter according to claim 16; and
a light amount measuring section operable to measure output light from the tunable filter,
wherein a spectral distribution of input light inputted to the tunable filter is measured based on a wavelength region modulated by the transmissive spatial modulator device and an intensity of the output light measured by the light amount measuring section.

* * * * *